(12) United States Patent
Johnson

(10) Patent No.: US 7,327,513 B2
(45) Date of Patent: Feb. 5, 2008

(54) METHOD AND APPARATUS FOR VIEWING TARGET

(75) Inventor: Richard W. Johnson, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 74 days.

(21) Appl. No.: 10/856,695

(22) Filed: May 28, 2004

(65) Prior Publication Data
US 2005/0018279 A1   Jan. 27, 2005

Related U.S. Application Data

(60) Provisional application No. 60/473,827, filed on May 28, 2003.

(51) Int. Cl.
G02B 21/36 (2006.01)
(52) U.S. Cl. .................. 359/363; 359/422; 359/423; 359/380
(58) Field of Classification Search ............... 359/363, 359/422, 423, 431, 399, 368, 379–381, 209, 359/211
See application file for complete search history.

(56) References Cited

U.S. PATENT DOCUMENTS

| | | | |
|---|---|---|---|
| 4,908,705 A | 3/1990 | Wight | |
| 5,206,503 A | 4/1993 | Toops | |
| 5,359,363 A | 10/1994 | Kuban et al. | |
| 5,553,052 A * | 9/1996 | Oono et al. | 369/112.17 |
| 5,583,632 A * | 12/1996 | Haga | 356/129 |
| 6,333,826 B1 | 12/2001 | Charles | |
| 7,130,115 B2 * | 10/2006 | Olszak et al. | 359/372 |
| 2001/0019398 A1* | 9/2001 | Agata | 353/100 |
| 2004/0252875 A1* | 12/2004 | Crandall et al. | 382/133 |

OTHER PUBLICATIONS

Shields, J.E., Johnson, R. W., Karr, M.E., An Automated Observing System for Passive Evaluation of Cloud Cover and Visibility, "A 220 Degree Whole Sky Imager," University of California, San Diego, Marine Physical Laboratory, Jul. 1992, p. 31.
PM NV RSTA Transparent Armor, webpage.
PM NV RSTA Unattended Ground Sensors (UGS), webpage.
Shields, J.E., Johnson, R.W., Karr, M.E., Burden, A.R., Baker, J.G., "Daylight Visible/NIR Whole Sky Imagers for Cloud and Radiance Monitoring in Support of UV Research Programs," International Symposium on Optical Science and Technology, SPIE the International Society for Optical Engineering, 2003.
Shields, J.E., Johnson, R.W., Karr, M.E., Burden, A.R., Baker, J.G., "Calibrated Fisheye Imaging Systems for Determination of Cloud Top Radiances from a UAV," International Symposium on Optical Science and Technology, SPIE the International Society for Optical Engineering, 2003.

(Continued)

Primary Examiner—Joshua L Pritchett
(74) Attorney, Agent, or Firm—Greer, Burns & Crain, Ltd

(57) ABSTRACT

Apparatus and method for viewing a target. A primary lens produces an image plane of the target, and an optical magnifier in an optical path of the primary lens magnifies a region of the image plane, providing a magnified image. A detector receives the magnified image.

19 Claims, 8 Drawing Sheets

OTHER PUBLICATIONS

Shields, J.E., Johnson, R.W., Karr, M.E., Burden, A.R., Baker, J.G., "Whole sky Imagers for Read-Time Cloud Assessment, Cloud Free Line of Sight Determinations and Potential Tactical Applications," The Battlespace Atmospheric and Cloud Impacts on Military Operations (BACIMO) Conference, 2003.

* cited by examiner

METHOD AND APPARATUS FOR VIEWING TARGET

PRIORITY CLAIM

This application claims the benefit of U.S. Provisional Application Ser. No. 60/473,827, filed May 28, 2003, under 35 U.S.C. § 119.

STATEMENT OF GOVERNMENT INTEREST

The invention was made with Government assistance under USAF Grant Nos. F19628-88-K-005 and F19628-88-K-0154. The Government has certain rights in the invention.

BACKGROUND OF THE INVENTION

The present invention relates generally to the field of image gathering.

Lenses for providing a large field of view to view a target, such as super-wide angle lenses (lenses having a field of view of at least 180°), are known in the art. Such wide-angle lenses have been particularly useful in varied applications where a large field of view is needed. Narrow field of view lenses are used where detail is needed. It would be beneficial to provide alternative methods for simultaneously providing the wide view and the detail when viewing a target or scene.

SUMMARY OF THE INVENTION

Preferred embodiments of the present invention provide an apparatus and method for viewing a target. A primary lens produces an image of the target at an image plane, and an optical magnifier in an optical path of the primary lens magnifies a region of the image at the image plane, providing a magnified image. A detector receives the magnified image.

DETAILED DESCRIPTION

Figure 1:
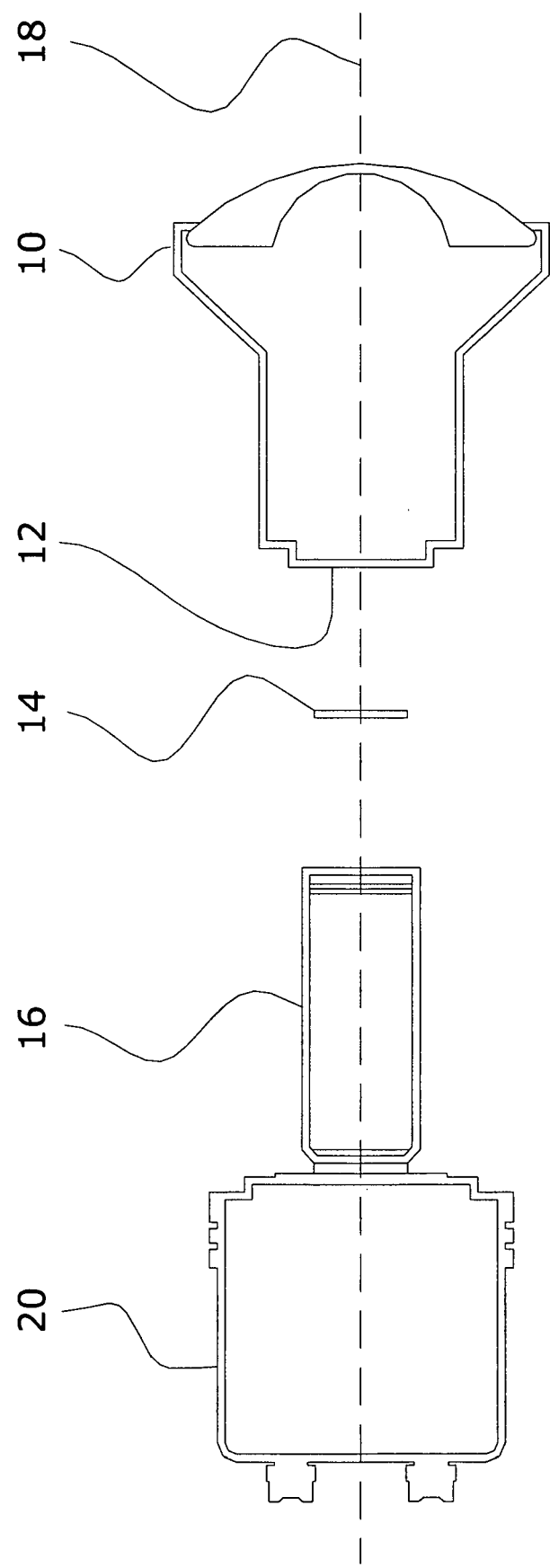
FIG. 1 is a schematic diagram showing a system for viewing a region of a target, according to an embodiment of the present invention.

Preferred embodiments of the present invention take advantage of the high information content inherent in the image plane from a primary lens such as a wide-angle lens, which is not normally used by a finite pixel resolution camera sensor. The information content of an optical plane may be defined in terms of the spatial frequency components in the image. The higher frequency corresponds to fine details, and the sharp edges normally associated with a sharply focused high-resolution image.

Generally, according to preferred embodiments of the present invention, one or more passive primary lenses are used to view a surrounding scene or target, and an optical magnifier provided behind the primary lens or lenses provides high-resolution views of specific regions of the full field of view (FOV).

In particular embodiments, an apparatus and methods performs search and magnification (zoom) operations on an original optical image emerging from a primary lens, such as a wide-angle lens or super wide-angle lens (also referred to as a fisheye lens), prior to an image's capture and degradation by electronic digitization or recording. Such super wide-angle lenses nominally possess FOVs of 180°, 220°, or more.

In some embodiments of the present invention, the beam out of the back of the primary lens is split. One of the resulting beams impinges on a detector, providing a full FOV image. Another beam or beams creates an identical image plane in free space. Small regions of this image or images are inspected with a magnifier such as a microscope lens system and imaged onto a second detector (and/or additional detectors). In this way, a high magnification version of a limited region of the primary lens' FOV may be seen on a second or additional monitor simultaneously with a full field view on the first monitor.

The magnifying optics either may be moved under control of the operator or by automatic predetermined search routines, so that different regions are inspected. An image of a full FOV may thus be available on a continuous basis, as specific regions may be identified for immediate detailed inspection.

Previous imaging systems for magnifying a region of interest use either electronic zoom or optical zoom lenses. However, electronic zoom does not have access to the full information content of the image plane. By the time an image is grabbed by a sensor having finite pixel resolution, any resolution greater than that of the pixel resolution is lost.

By contrast, according to the present invention, optical magnification is used to inspect the image plane, thus retaining this information. Further, in contrast with previous optical zoom lenses, if the optical zooming occurs behind the objective lens, no moving external parts are required for the viewing system, and the direction of viewing is covert. Further, if the moving parts are disposed behind the lens, design of the system may be potentially far more robust than a system having external zooming, or zooming in a front lens package.

In an embodiment of the present invention, a primary lens viewing a target produces a full field image. An optical magnifier is trained on a region of the focal plane produced by the primary lens, which is a full field image, and the resulting magnified image provided by the optical magnifier is received by a detector for viewing, capturing, and/or processing the magnified image. This magnified image is a high resolution image of a region of the full FOV, and provides more information for this region than would be present if the full field image were digitized and particular pixels were magnified using electronic zoom.

In another embodiment, a beam splitter is disposed between an exit pupil of the primary lens and the focal plane of the primary lens. The beam splitter creates two separate, but normally identical image planes representing the full FOV. An image at one of the image planes is detected to provide a full FOV, and an optical magnifier is trained on a region of the image at the second image plane to provide a magnified image of a region of the full FOV.

By positioning the magnifier, for example by using a translating stage, the region magnified to produce the magnified image can be selected. This selection may be controlled by an operator, producing a view of a region of interest (ROI), or the selection may be automatic.

In another embodiment, instead of selecting a region solely by changing the position of the microscope objective, the entire flux bundle (image forming rays) behind the image plane can be made to rotate about the optical axis. A magnifier can be trained on an individual part of the rotating flux bundle for detailed inspection. For example, by inserting a collimator and rotating dove prism between a full field image (such as one of those located in the two image planes from the beam splitter) and the magnifier, continuous scans of a FOV, such as the horizon, may be provided. The full FOV may be simultaneously provided, if desired.

In yet another embodiment, the primary lens, rather than being a single lens, may comprise multiple lenses. For example, individual lenses may look horizontally from each side of a moving vehicle, as opposed to a single lens looking, for example, from the top of the vehicle.

In still another embodiment of the present invention, a larger FOV lens, such as a 220° FOV lens, may be used, but with a different camera. On the other hand, a more limited field of view than 220°, or even than 180°, may be used for particular applications.

In still another embodiment, multiple detectors, and multiple beam splitters may be used for providing additional or alternative views of a target. Such views may include, for example, daytime and night time images, infrared detection, and/or others. Additionally, exemplary embodiments of the present method and apparatus may be implemented onto various vehicles or sites such as surveillance sites for detailed observation.

Referring now to the drawings, FIG. 1 shows a primary lens, for example a wide-angle lens such as a fisheye lens 10, that receives an image from a target (not shown). The primary lens 10, for example, may look vertically or horizontally through the top of a tank, robotic vehicle, unattended ground sensor, or other platform. A focal plane 14 is created by the beam coming out of an exit pupil 12 of the primary lens 10. This focal plane 14 includes information representing a full field of view (FOV) as observed by the primary lens 10.

An optical magnifier, which in FIG. 1 is embodied in a microscope 16, is positioned behind the focal plane 14. As shown in FIG. 1, the microscope 16 is positioned along a center-line 18 of the fisheye lens 10 and directed at a region of the image at the focal plane 14, though this is only an exemplary location for the microscope. The microscope 16 optically magnifies a region of the full field image provided at the focal plane 14 to provide a magnified image. The magnified image is a high-resolution image of the region to which the microscope 16 is trained. This region is less than the full FOV, and may be, for example, a region of interest (ROI) that is a part of the full FOV of the target observed by the fisheye lens 10.

The output of the microscope 16, a high magnification region of the FOV, is perceived by a detection device, such as, but not limited to, a camera 20, which is disposed along an optical path of the exit beam of the microscope 16. In this way, the ROI can be observed by an operator in high resolution separate from the full field of view provided by the fisheye lens 10.

In an exemplary embodiment of the configuration shown in FIG. 1, the primary lens 10 is a 220° FOV fisheye lens, the microscope 16 is an ×10 microscope objective, and the camera 20 is a 2048×2048 slow-scan chilled charge coupled device (CCD) imager. These parts are merely exemplary, and it will be understood that various substitutions may be made for the parts shown in this embodiment and other embodiments of the present invention. Various choices are possible for the type, positioning, number, and/or use of the primary lens 10, the behind the lens optics, the manner of selecting the region for high resolution display, and/or the detection device 20.

For example, it may be desired to view the high-resolution image of the region and the full FOV simultaneously. In another embodiment of the present invention shown by example in FIG. 2, the primary lens 10, for example, having a 180° FOV or more, is directed toward a desired target (not shown), creating a bundle of image forming rays emerging from its exit pupil 12 and converging at the back focal plane 14 (shown in FIG. 1) of the lens. For example, the lens 10 may have an image plane that occurs approximately a short distance, such as 47 mm, behind the exit pupil 12 of the lens 10. At this point the image focused is in free space, and not visible to the unaided eye.

At a convenient distance behind the exit pupil 12, but prior to reaching the back focal plane 14 (shown in FIG. 1), the output flux bundle (the image forming rays) is intercepted by an optical beam splitter 22, such as a right-angle beam-splitting prism. The beam splitter 22 is disposed at a distance along the optical center-line 18 (shown in FIG. 1) that is beyond the exit pupil 12 of the primary lens 10, and short of the lens' focal plane 14. The splitter 22 diverts the image forming rays into two bundles, each of which converges to form first and second typically identical images at image planes 24, 25 at two separate points in space. At this point, the system now has two physically separated, but optically identical images, at their original optical resolution, available for inspection. As a target scene observed by the lens 10 changes, each of the two separate and optically diverted images 24 and 25 changes exactly and instantly, as does the original.

The image at the first image plane 24 is used to observe the full field FOV, and the image at the second image plane 25 is used for inspection by a microscope objective or other magnifying optic to provide a high-resolution view of a region of the full field. This allows the high-resolution view to be simultaneously available for viewing with the full scene view.

Figure 2:
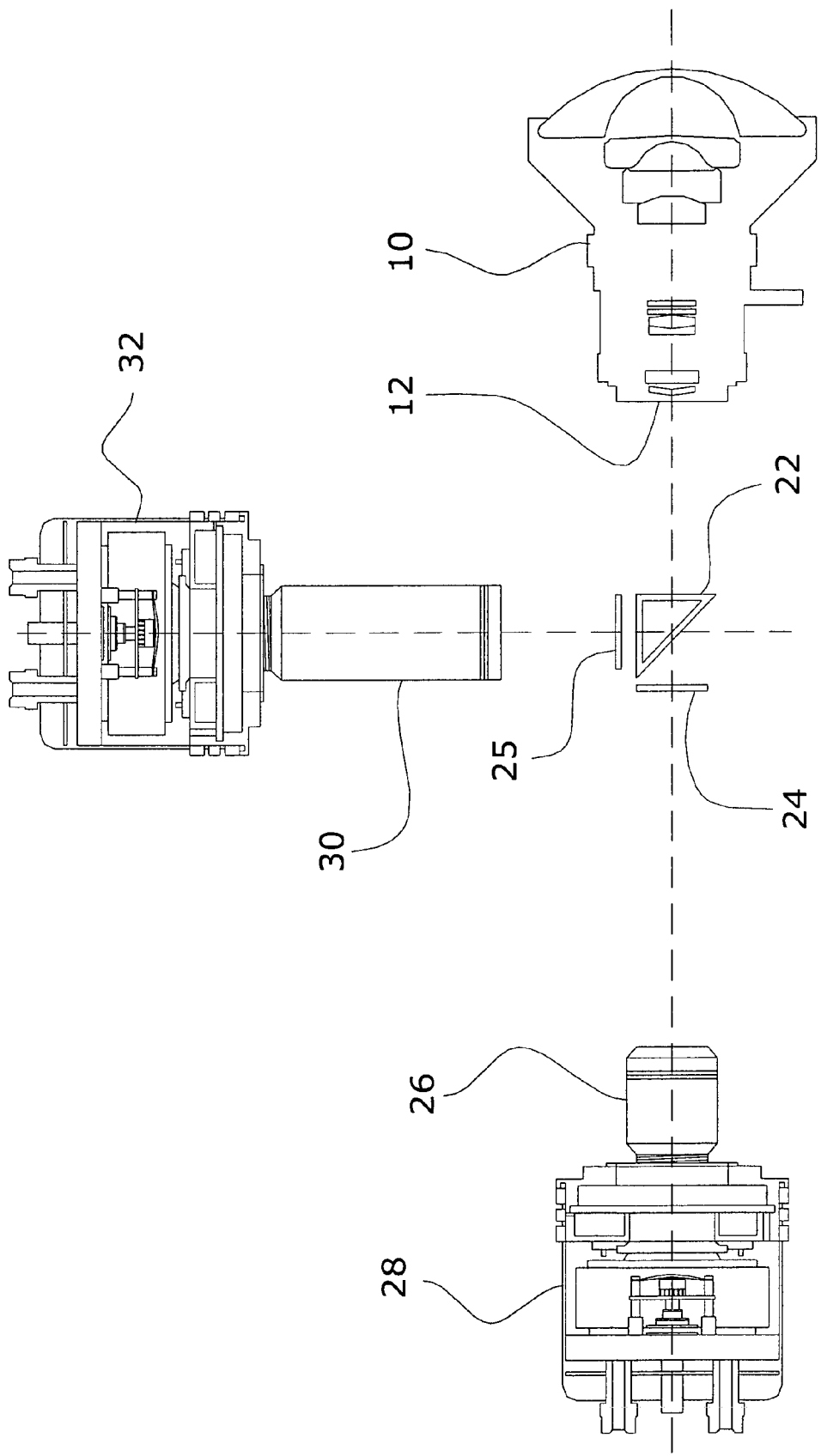
FIG. 2 shows an apparatus for viewing a target and a region of the target, according to another embodiment of the present invention.

As shown in FIG. 2, the beams from the beam splitter 22 providing the image at the first image plane 24 impinge on an FOV adapter such as a lens 26, or a minifier for example a fiber-optic taper, in the optical path of a detector 28, such as a CCD camera. The lens or minifier 26 preferably allows capture of the full FOV from the image at the first image plane 24 by the detector 28 for processing and viewing of the full field image. Alternatively, a sufficiently large camera can be used, so that the minifier 26 can be omitted, in which case the image plane is placed directly on the sensor such as the CCD chip.

For example, the detector 28 may be a low noise, high sensitivity digital video camera fitted with a fiber-optic taper or a lens (the minifier 28) focusing on the image at the first image plane 24. The image at the first image plane 24 is converted into a digital data stream, which enables the image to be displayed on any of a variety of digital displays for visual viewing. If the detector 28 observes moving images, every frame of the video will contain a view of the full scene observed by the primary lens 10, which will enable a broad variety of high-speed interpretive analyses.

The image at the second image plane 25 preferably is identical to the image at the first image plane 24, positioned in free space. (The beam splitter may also be such that the image plane 25 receives more or less flux than the image plane 24.) Regions of the image at the second image plane 25 may be inspected with a magnifier 30, such as a microscope similar to that described regarding the embodiment of FIG. 1, and imaged onto a second detector 32, such as a second CCD camera. The image at the second image plane 25 is viewed by the microscope 16 (FIG. 1) or 30 (FIG. 2), which is optically linked to a second detector 32. The camera may be similar to camera 28.

In this way, a high magnification version of a region of the full FOV observed from the primary lens 10 may be viewed as a second image simultaneously with the full FOV. The full FOV and region of interest (ROI) images, if digitized, may be processed in any desired manner, and may be observed on the same monitor or on different monitors (not shown). The magnification of the magnifier 30 preferably can be changed in an appropriate manner according to the application's requirement for field of view and resolution.

The generation of this duality of preferably equivalent image planes is important to generating full scene imagery and magnified regional imagery, simultaneously by two independent detection systems 28, 32, focused on their images at individual target image planes 24, 25, prior to any image digitization processes. With this duality, optimum resolutions within any given downstream inspection of the original FOV of primary lens 10 is provided.

In order for this concept to be optimized, the information content at the second image plane 25 should be sufficient to maintain a high quality image, even after further magnification. Usually, the spatial resolution of an image is much higher than the spatial resolution of a CCD. This allows optical extraction of a portion of the image at the second image plane 25 and magnification of the plane in a useful manner. This also allows superior resolution to electronic zooming systems, particularly when this internal optical zoom is used in combination with subsequent electronic zooming.

In an exemplary embodiment of the present invention, the cameras 28, 32 shown in FIG. 2 are a mix of GE CID776 and Cidtec CID2710 digital video cameras. Other cameras may be used. The scanning microscope 16, for example, may be a Melles Griot 04TFF002 fine focusing body, suitable for use with standard Huygenian eyepieces and standard achromatic objectives. An Edmunds replacement type relay lens is used to optically link the microscope 16, 30 and the video camera 32.

In the embodiments shown in FIGS. 1 and 2, by moving the magnifying optics of the magnifier 16, 30 to a different position with respect to the second image plane 25, different regions of the full FOV may be magnified for inspection by an operator or by an appropriate system. The magnifier 16, 30, for example, may be positioned by a translator (not shown), such as, but not limited to, a two-axis (X-Y) mounting assembly.

The translator allows the field of view of the magnifier 16, 30 to examine systematically any selected region of the image at the second image plane 25, which corresponds to the original image of the primary lens 10. That is, by using a translator to move the magnifier 16, 30 in x,y space, it can scan the full image, thus providing ROI view of any selected part of the image.

By moving the magnifier 16, 30 along both axes, the full FOV can be scanned, and a high-resolution view of the selected ROI can be viewed and/or processed. If mechanically connected, the second detector 32 and the magnifier 30 may be moved together by the translator in particular embodiments for selecting the region to magnify. The translator may be operated under manual control of an operator or controlled by automatic predetermined search routines or motion detection routines. If the first and second images at the image planes 24, 25 are provided for simultaneous observation, an image of the full FOV may be available on a continuous basis, while specific regions may be identified for immediate detailed inspection. The observation may be used in interactive mode in the vehicle, interactive mode from a remote site, where proper communication is incorporated, or in full robotic mode.

In yet another embodiment, an additional optical element is used to provide a faster, smoother, more reliable procedure for scanning an image. In this embodiment, the image rays beyond the second image plane 25 move instead of or in addition to the magnifier 16 to select regions of the full FOV. As shown in the exemplary embodiment of FIG. 3, a collimator, embodied in a pair of plano-convex lenses 34 and a dove prism 36, is optically and mechanically coupled and added to the optical path of the second image plane 25 prior to reaching the objective lens of the magnifier 30. The collimator 34 in the embodiment shown in FIG. 3 may be, for example a pair of plano-convex lenses to provide a collimated beam 37 into the rotating dove prism. The collimated beam transfer optimizes the performance of the associated dove prism.

By inserting the collimator 34 and the rotating dove prism 36 between the second image plane 25 and the magnifier 30, the apparatus may be used to provide continuous scans of a horizon, while simultaneously providing a full view. Adding the collimator 34 and the rotating dove prism 36 causes the ray bundle behind the second image 25 to rotate about its optical center-line, without changing its location. By mounting the magnifier (microscope objective 30) so that it looks continuously at the edge of an exit image 38 from the dove prism, this results in a continuous scan of the horizon. In the configuration shown in FIG. 3, a video camera or other reasonably high-speed camera is preferred as the detector 32.

The dove prism 36 provides several benefits. For example, rotation of the dove prism 36 around its optical/mechanical center-line causes an entering image, such as the image from the second image plane 25, to rotate about its center at twice the rate of rotation of the dove prism, without optical deviation. Thus, if one were to observe a stationary wheel through a dove prism which was aligned with the wheel's axle, and the dove prism was rotated, the wheel would appear to be spinning about its hub as if it were being driven normally.

As the ray bundle behind the second image plane 25 from the primary lens 10 rotates, the magnified view from the magnifier 30 sweeps through a circumferential scan of the image, which is defined only by the radial offset of the magnifier. For example, the embodiment shown in FIG. 3 may further include a single axis translation table (not shown) to which the detector 32 and the magnifier 30 are mounted, which moves the camera and the microscope along a radius of the exit image 38 of the dove prism 36. This single translation, in conjunction with the controlled rotation provided by the dove prism 36, could then be used to enable acquisition of the high-resolution view anywhere in the image. In the embodiment shown in FIG. 3, the magnifier 30 (and in an exemplary embodiment the connected second detector 32) is offset from the optical center-line 18 of the primary lens 10 to an offset optical line 40. By providing a one-axis translation of the microscope's FOV along the radius of the image at the exit image plane 38, an every point search within the full FOV can be enabled.

Figure 3:
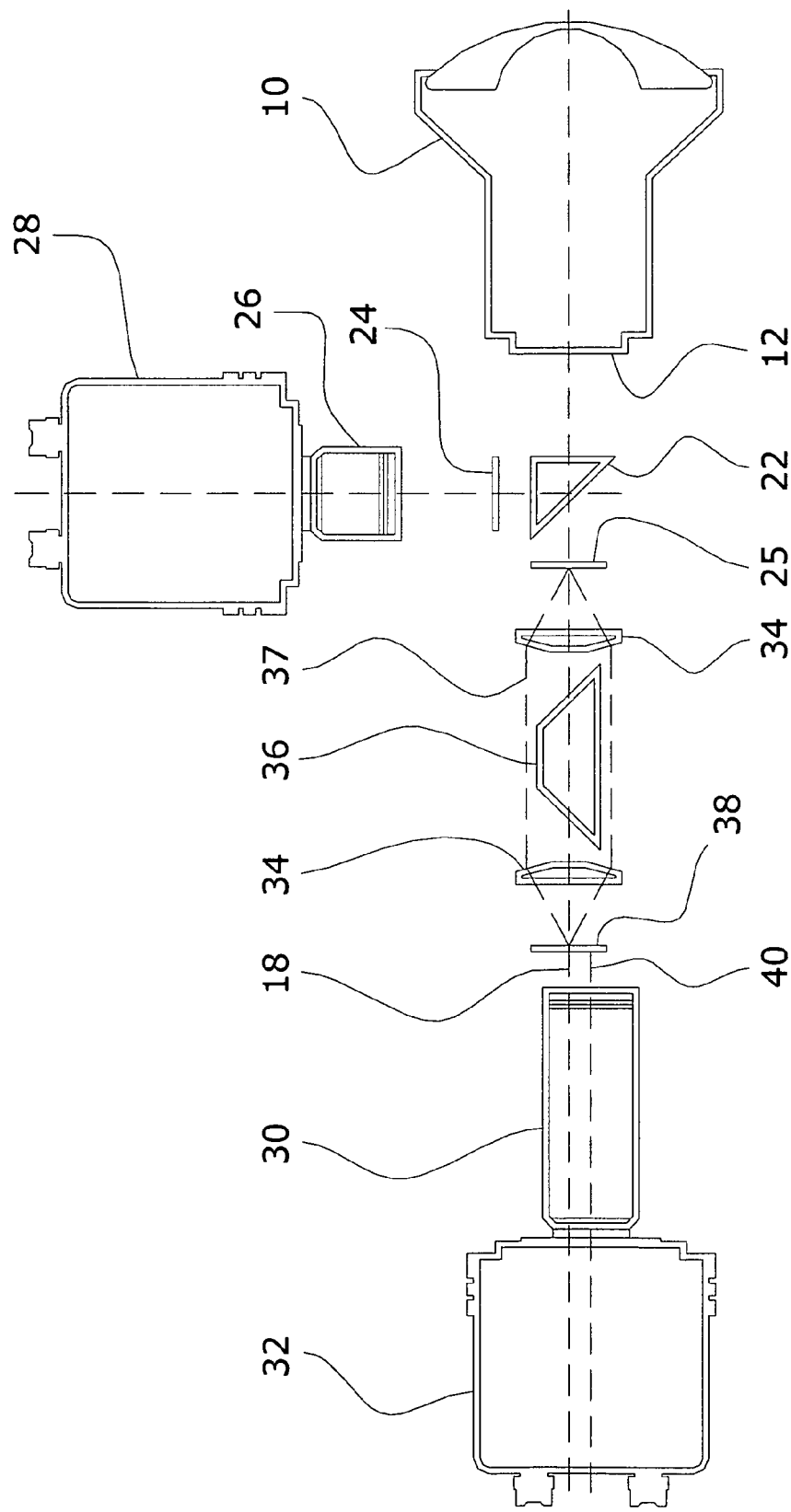
FIG. 3 shows another embodiment of the present invention, including a rotating dove prism disposed in an optical path of one of the output beams of the beam splitter.

For example, with the rotating image of the original fisheye FOV appearing at the exit image plane 38 and with the microscope aligned moderately off the optical center-line, if one defines the FOV of the magnifier 30 to be a pie-shaped segment of the original image, the images presented to the detector 32, as shown in FIG. 3, will be a series of segments, which will sequentially cover the entire original fisheye FOV at a rate defined by half the rotation speed of the dove prism 36. The scan rate of the image at the second image plane 25 may be controlled by simply adjusting the rotational speed of the dove prism 36.

In another embodiment, the magnifier 30 and the detector 32 may be attached to a single axis translation mechanism that allows it to sweep its FOV along a pre-selected radius or diameter in conjunction with the rotating image at the exit image plane 38. These choices, and other choices which will be apparent, will depend on the application to which the invention is implemented, as well as other needs (robustness of the package, etc.). For other applications, the characteristics of the anticipated target or site may be an important consideration.

In addition, it may be appropriate to change the amount of magnification of the system. If the magnifier 30 is, for example, a quality parfocal zoom microscope, magnifications by the microscope may be changed without refocusing. Alternatively, if changing magnification results in a change of the focal length to the image plane 38, focusing may be accomplished by adjusting the object distance of the magnifier 30 by using a rack and pinion, as one of the orthogonal drives on a precision two axis mounting assembly. For example, one drive may be along the optical center-line, to adjust focus, and one across the exit image plane 38.

Several variations of primary lenses are possible. For example, a 220° FOV lens may be preferable to a 180° FOV lens for the primary lens, such as in the case of an unattended ground sensor with a 220° lens pointed vertically. In this way the primary lens could not only see the full sky above the horizon, but also objects up to 20° below the horizon. Alternatively, if the system were designed to detect objects or people overboard on a ship, then a 60° FOV with zooming optics may be optimal. According to another embodiment of the present invention, the primary lens, instead of being a single full image lens, may be multiple lenses, for example, multiple fisheyes. In an exemplary embodiment, an individual fisheye can look horizontally out each side of a moving vehicle, rather than, for example, looking upward from the top of the vehicle.

Figure 4B:
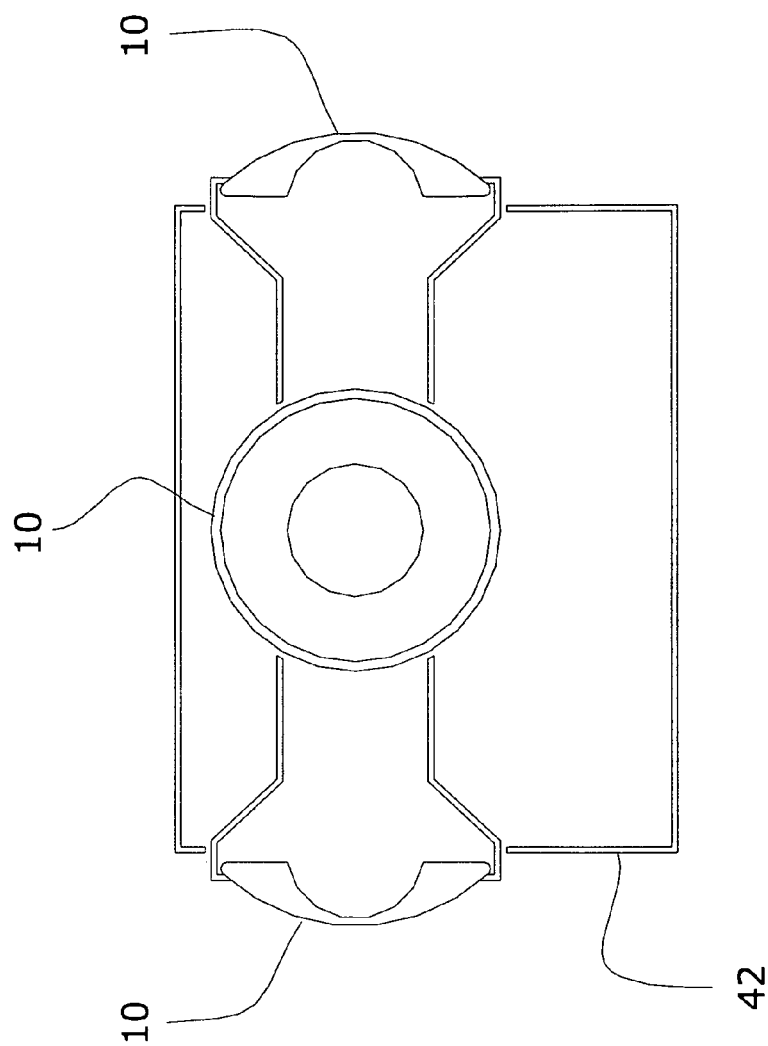
FIG. 4 shows configurations of single and multiple fisheye lenses, respectively.
Figure 4A:
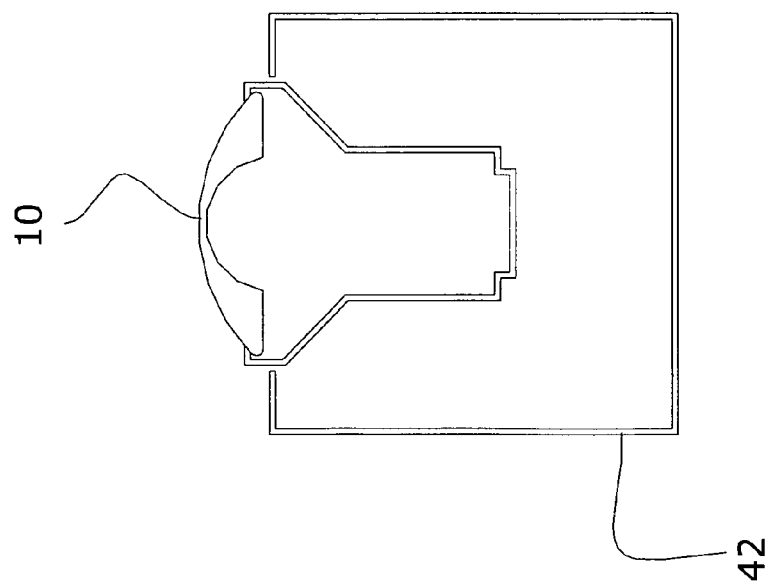

In FIG. 4A, for example, configuration A shows a single primary (fisheye) lens 10 vertically oriented facing the sky from a top of a turret 42. In this case, a primary lens with a larger FOV, such as 220° or more, may be useful. In FIG. 4B, by contrast, four fisheye lenses 10 are disposed 90° apart from one another, horizontally oriented, facing the horizon. In a tank, if there is no way to place the primary lens on top of the tank, the combination of three or four lenses 10 looking horizontally as shown in FIG. 4B may be the most useful combination. With the multiple lens configuration, the images may be combined into a single monitor display, or multiple displays may be shown, depending on the needs of the user. Likewise, the images may be imaged onto separate cameras, or a rotating prism assembly may be used to present the image planes from the four lenses sequentially onto the same camera.

Figure 5:
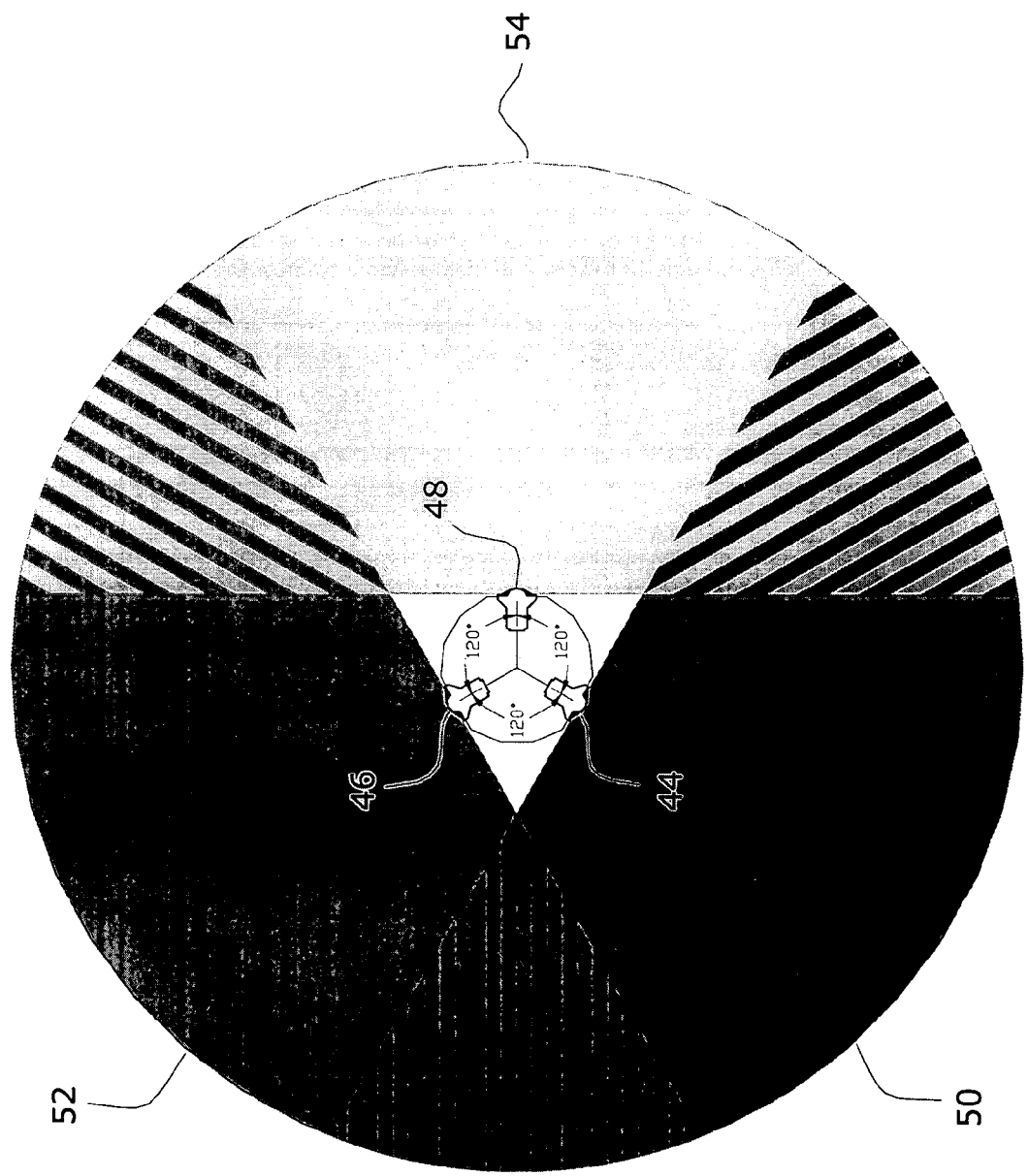
FIG. 5 shows overlapping field of view from three lenses or cameras, according to another embodiment of the present invention.

FIG. 5 shows a lens configuration for the primary lens, in which three fisheye lenses 44, 46, 48 are disposed 120° apart from one another, facing horizontally. If each lens has a FOV of 180°, for example, each lens 44, 46, 48 provides a semicircular FOV 50, 52, 54 respectively. Several zones of overlap within a composite image are created as shown in FIG. 5, resulting in redundant data sources for targets within these zones. The overlapping data are useful for internal image registration calibration, and related azimuth and elevation verifications. Additionally, having multiple interchangeable lens assemblies enables emergency field repairs to occur while continuous surveillance under restricted precisions is deemed necessary. In other words, if the fisheye lens 46 were to fail, the two remaining fisheye lenses 48, 50 can be moved to be mounted back to back, thus providing full scene viewing of the horizon, although without the redundancy that results in potentially higher precision (if the FOV of the lenses is 180°). In multiple lens systems, each of the three fisheye assemblies may be made identical. It is the physical separation of the lenses and the distance of this optical array above a surface (ground, sea surface, etc.) that defines the degree of $4\pi$ steradian spherocity of their reconstituted composite field of view.

The speed of the rotating dove prism 34, the offset of the magnifier 30, and/or the translation (one axis and/or two axis) of particular detectors 32 may be under the control of the operator, and/or be under an automatic process. For example, if an operator is at a site of an instrument, or linked in with fast communications, one could use a touch sensitive screen to indicate a selected ROI. The computer controls may then direct the magnifier or other optics to image and display this area. Technology such as heads-up displays may be useful in the place of monitors. Such displays may also be combined with technology that tracks a direction a user is looking, and thus a user may simply look at a desired ROI and click a button to indicate that they wish to see the high resolution view. Alternatively, the selection of an ROI may not require human interaction at all.

In addition to the dove prism 36, which continually scans a horizon, it is possible to cause a single or two axis translator of the magnifier 30 to sequentially scan various scan lines provided by the dove prism. Use of the dove prism 36 is preferred to using only a two axis mechanical translator for scanning the horizon, as it removes inertial effects and provides a smoother and faster scan. In another alternative embodiment, the system may take images in quick succession (such as with a video camera), and look for differences in the image, to detect motion. If motion is detected, the magnifying optics such as the magnifier 30 may be designed to automatically point to the direction with the most motion. This may be useful, for example, for unattended ground sensors or for surveillance of sites.

Figure 6:
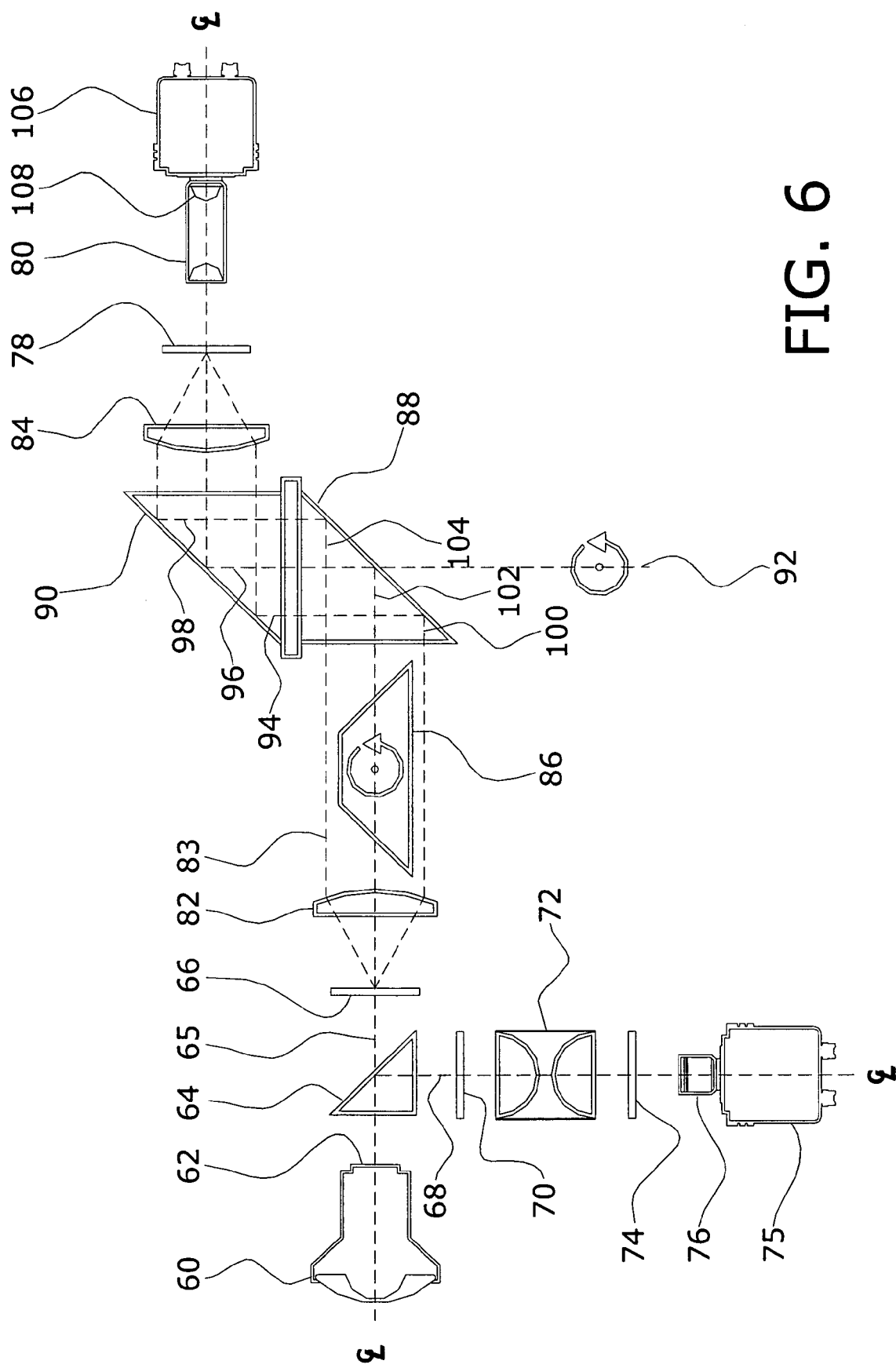
FIG. 6 shows another embodiment of the present invention, showing a rotating right angle TIR prism disposed in the path of an output beam of the rotating dove prism.

FIG. 6 shows an embodiment of the present invention in which selection of a region along two axes or degrees of freedom can be performed by selection of the beams impinging on the magnifier preferably without requiring translational movement of the magnifier. As shown in FIG. 6, a primary lens 60, for example, may be a super wide-angle, 180° FOV, F/2.8 lens, such as designed by Nikon for use on 35 mm film cameras. However, equivalent or similar quality lenses may be used. The beam from an exit pupil 62 enters a beam splitter 64, which may be, for example, an optical beam splitter such as a prism, which splits an optical output of the lens into two separate beams of equal quality. One beam continues along the original optical axis 65 and forms an image of the original target scene at image plane 66. The second beam travels along a secondary optical axis 68 at 90° with the original optical axis 65, and forms an equivalent of the original target scene at a second image plane 70. The images formed at the image planes 66, 70 are essentially identical in terms of information content.

A lens pair 72 refocuses the full scene image at the second image plane 70 to a third image plane 74 at a longer distance from the splitter 64. This relocation provides optical mechanical convenience, as well as some magnification adjustment capability in optimizing the size of the image at the third image plane 74 with a detector 75. The detector 75 is embodied, for example in a digital camera for viewing and/or processing the full scene. The lens system 79 of the detector preferably is selected to match the target image size at the third image plane 74 with the detector's image detector array. Once this full FOV is captured by the detector, its digitization, transfer, storage, and display may be controlled, for example, via the camera's on-board optical electronics or via the control computer.

The full target scene as captured by lens pair 72 and the detector 75 preferably is the exact optical equivalent of the scene simultaneously scanned using the image at the first image plane 66. The full FOV image at the first image plane 66 is optically scanned and a selected subset of this image is transmitted to create a new image at a fourth image plane 78 for final magnification by a magnifier such as a microscope 80. For scanning the image at the first image plane 66, a first collimator lens 82 and a second collimator lens 84 at a different position provide a collimated beam 83 that enables the image forming rays from the image plane to travel through a dove prism 86, a first total internally reflecting (TIR) right angle prism 88, and a second TIR right angle prism 90 with minimal optical distortion and/or dispersion. The collimator lenses 82, 84 provide a "clean optical pipeline" within which the image scanning processes can occur with minimum optical impact on the final image quality.

The dove prism 86, also referred to as an image rotator, provides the first of two processes which together enable the complete optical scanning of the image at the first image plane 66 at very high optical resolutions. When an optical image passes through the dove prism 66 on a path parallel to the prism's optical axis, the rotation of the dove prism about its optical axis causing the emerging image to rotate at twice the rate of prism rotation.

The TIR right angle prisms 88, 90 form the second half of the system's optical scanner. The first TIR right angle prism 88 is designed to completely intercept the collimated beam emerging from the dove prism 86 and direct this beam into the second TIR right angle prism 90. The first TIR prism 88 rotates about a vertical axis 92 through the optical center-line 65. This enables horizontal scan (along the image diameter). The first TIR prism 88 is located such that its emergent optical rays 94, 96, 98 are at right angles to the dove prism optical center-line (which, in the embodiment of FIG. 6, is also optical center-line 65) and such that the dove prism ray bundle edge and center-line rays 100, 102, 104 impinge symmetrically at the prism's reflective surface.

The second right angle TIR prism 90 redirects the system optical center-line to its original course but slightly offset. Preferably, the second TIR prism 90 is a fixed prism. It does not move, but rather it is used solely to align the system optical path with the intended entry into the fourth image plane at position 78.

To function as an optical scanner, both the dove prism 86 and the first TIR prism 88 are driven to rotate about their optically orthogonal center-lines. Thus, as the dove prism 86 rotates the target image in a plane perpendicular to its optical center-line 65, the first TIR prism 88 moves its FOV along a specifically fixed diameter of the target image, i.e., that diameter which lies in a plane containing the optical center-line 65 and is perpendicular to the axis of rotation of prism 88.

The operation of the optical scanner is easier to visualize if one considers a scan and stop example. For example, the primary lens 60 looks horizontally at a scene with the sky, the horizon, and the beach. It sees the full scene from the zenith to nadir. Next, consider at the fourth image plane 78, the image the magnifier 80 (microscope optics) will interrogate. As the dove prism 86 rotates slowly, the horizon appears to rotate. When the horizon appears horizontal, the dove prism 86 stops. The first TIR prism 88 rotates its FOV in its horizontal plane. Slow rotation of the first TIR prism 88 allows the FOV center point to slowly sweep the fixed horizon. If the dove prism 86 is rotated, so that some other image diameter appears horizontal, the TIR prism 88 allows a sweep along the new diameter. Thus, with rotation of the dove prism 86, the first TIR prism 88 can sweep the entire image. The dove prism 86 and the first TIR prism 88 rotational speeds are independent. The FOV of the first TIR prism 88 about its center-line is adjustable. Combined rotation of the dove prism 86 and the first TIR prism 88 results in a scan pattern analogous to mechanical X-Y scanners, but with smoother and quieter search characteristics, and much faster response than can be achieved with conventional X-Y translation tables.

The second collimator lens 84 is the mate lens to the first collimator lens 82. It receives the collimated image subset (collimated by the first collimator lens 82) that has been selected by the first TIR prism 88 and refocuses it into an image at the fourth image plane 78. This new subset image can be manipulated in size by the selection of particular specifications for the second collimator lens 84. However, it can still retain nearly all of the optical quality of its parent image at the first image plane 66.

The magnifier 80 provides a subset magnification function, and a detector 106 receives the resultant magnified image. Thus, the primary lens 60 generally optically acquires a target image and the beam splitter 64 splits it into two identical images for manipulation and display over two optically independent channels. The first independent channel is the digitization and display of the full target scene by the detector 75. An optical scan and search mechanism provided by the dove prism 86 and the first TIR prism 88 locates and extracts small high-resolution subsets of the original image and provides these optically enhanced subsets for final optical magnification, digitization and display by the detector 106. The optical magnifier 80 is preferably designed to examine the subset image at the fourth image plane 78 at multiple magnifications in conjunction with the second collimator lens 84, its own microscope objective lens, and if desired an internal optical relay 108 similar to the lens pair 72. The internal optical relay 108 preferably also is configured to assist matching the FOV required for the image at the fourth image plane 78 to the imager chip of the detector camera 106. It is possible, for example, to use currently available commercial microscope systems for the magnifier 80 and the lens pair 108, as well as the lens pair 72. However, to improve size, optical power, zoom, and matching characteristics between the image at the fourth image plane 78 to a desired focal plane array of the detector 106, it may be preferred in certain cases to customize the design.

The detector 106 preferably embodied in a digital camera is a preferred detection device for a scene subset imager. A relatively low energy level for an image at the fourth image plane 78 compared with an image at the third image plane 74 for example, may require a top of the line, 16 bit, cooled low noise imager. Once the image at the fourth image plane 78 is captured, as with the detector 106, its digitization, transfer, storage, and display preferably are controlled by the camera on-board electronics and control computer. In an alternative embodiment, the full scene image is omitted.

The image rotation and diameter scan functions performed by the dove prism 86 and the TIR prism 88 can be readily enhanced through the use of counter-rotating prism pairs for each of these components. The counter rotation of matched image rotators and beam diversion prisms allows their functional impact to be controlled by relatively simple, individual rotational speed control. This results in mechanically smooth, vibration free point-by-point scanning of the full image.

Figure 7:
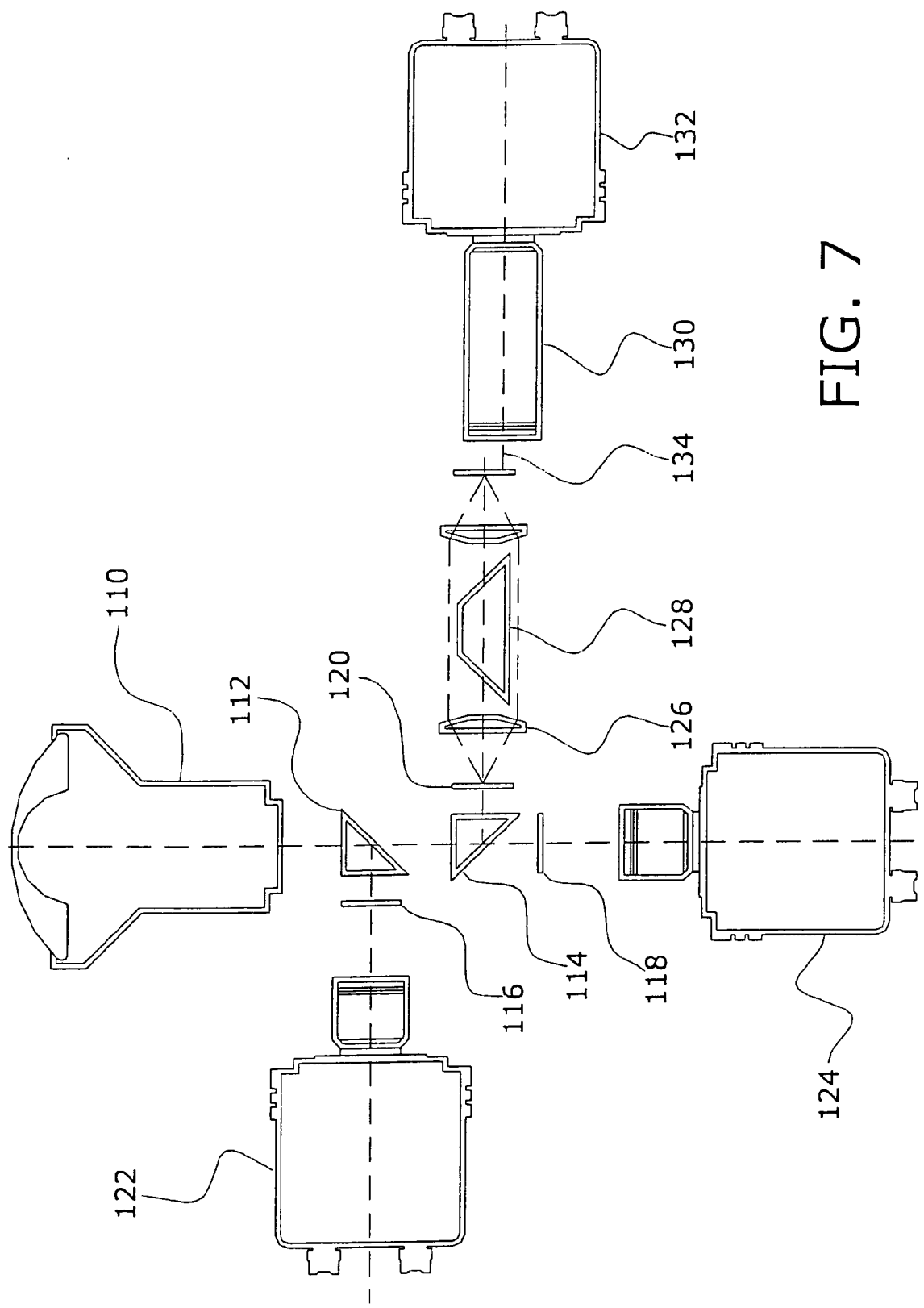
FIG. 7 shows an additional embodiment of the present invention, showing a pair of beam splitters, and both daytime and night time cameras.

Different types of detectors may be used for various purposes. For example, FIG. 7 shows a primary lens 110 having an output flux bundle that is split by a pair of beam splitters 112, 114. The beam splitters are disposed so that the image from the primary lens 110 is split into a first output beam to provide an image at a first image plane 116, and a second output beam that is split by the second splitter creating images at second and third image planes 118, 120. The image at the first image plane 116 is received by a full scene, low noise, dusk-nighttime camera 122. The image at the second image plane 118 is received by a full scene, full video rate, daytime camera 124 viewing the visible spectrum for a day-dusk display. Finally, the image at the third image plane 120 is rotated using a collimator 126 and rotating dove prism 128, providing a scanning beam, which is picked up by a magnifier 130 (or magnifying adapter) and a high intensity zooming ROI camera 132.

The camera 132 may be, for example, a high sensitivity, low flicker refresh rate, variable zoom assembly. The magnifier 130 may be moveable by a translator along a radius of the rotating image, have a center-line 134 offset from the center-line of the dove prism 128. Alternatively, features of the embodiment shown in FIG. 7 may be combined with features described previously (e.g., use of a rotating TIR prism). As shown, while visible light may be used and detected, the present invention is not limited to detection using visible light. For example, a viewing system may be developed for infrared (e.g., near infrared (NIR)). Magnifying optics may be used to allow observation in the IR wavelengths, for example. The use of a nighttime sensitive digital camera, for example, in conjunction with a video rate daytime sensitivity digital camera can provide more flexibility in the use of an observation system.

Methods of choosing the ROI may vary depending on the application. For example, the touch sensitive screen is used to display the full scene image, and the user could touch a portion of the image to indicate the regions of interest desired for inspection with the magnifying optics. These optics could be, for example, on an X-Y translator stage to inspect the appropriate portion of the image plane. In other cases such as the previously described embodiment having a dove prism for an automated horizon scanner, it may be that no interaction is desired. Yet another approach is to use a system that monitors the user's viewing direction and indicates to a computer, for example, the region of the image at which the user is looking. In this case, the user would look at the portion of the full scene image that is of interest, and indicate, for example by pushing a button or speaking, that this is the desired region for full resolution display.

Yet another version may use a high-resolution CCD, such as a 2048×2048 chip viewing the primary, full scene image. The user could then indicate an area of potential interest, which would then receive immediate electronic zoom for a high-resolution display. If that region is still of interest the user can indicate this, and the optical zoomer would monitor this part of the image plane to provide a full optical zoom of the ROI (with higher resolution, as described above).

In an exemplary method for selecting and viewing regions, referring again to FIG. 7, one or more displays are configured to display a sequence of images. At a time T1 on a display A1, for example, a full scene, day-dusk display is provided by the day-dusk camera 124. If a threat is detected using the day-dusk camera 124, automatic and/or manual control is provided to select an ROI for that threat. A threat location and identification routine occurs, and a new A1 display at time T2 includes a full scene, together with the ROI, as provided by the zooming ROI camera 132. This first ROI scene may be based on a digitization of the optically magnified ROI, and may be a low resolution image. If the ROI scene is selected for more prominent display, or if, for example, the threat is validated or there is a command alert, a high-resolution ROI scene, which can be trained on the threat by the zooming ROI camera 132, is displayed prominently in display A1 at time T3, and the full day-dusk scene is reduced in prominence on the display or moved altogether.

A similar sequence can occur with a night-time camera 122 on the same or a separate display. The ROI scene in the second case may be, for example, a zoomed dusk-night ROI. This system, for example, may be used on a tank or other vehicle.

Figure 8:
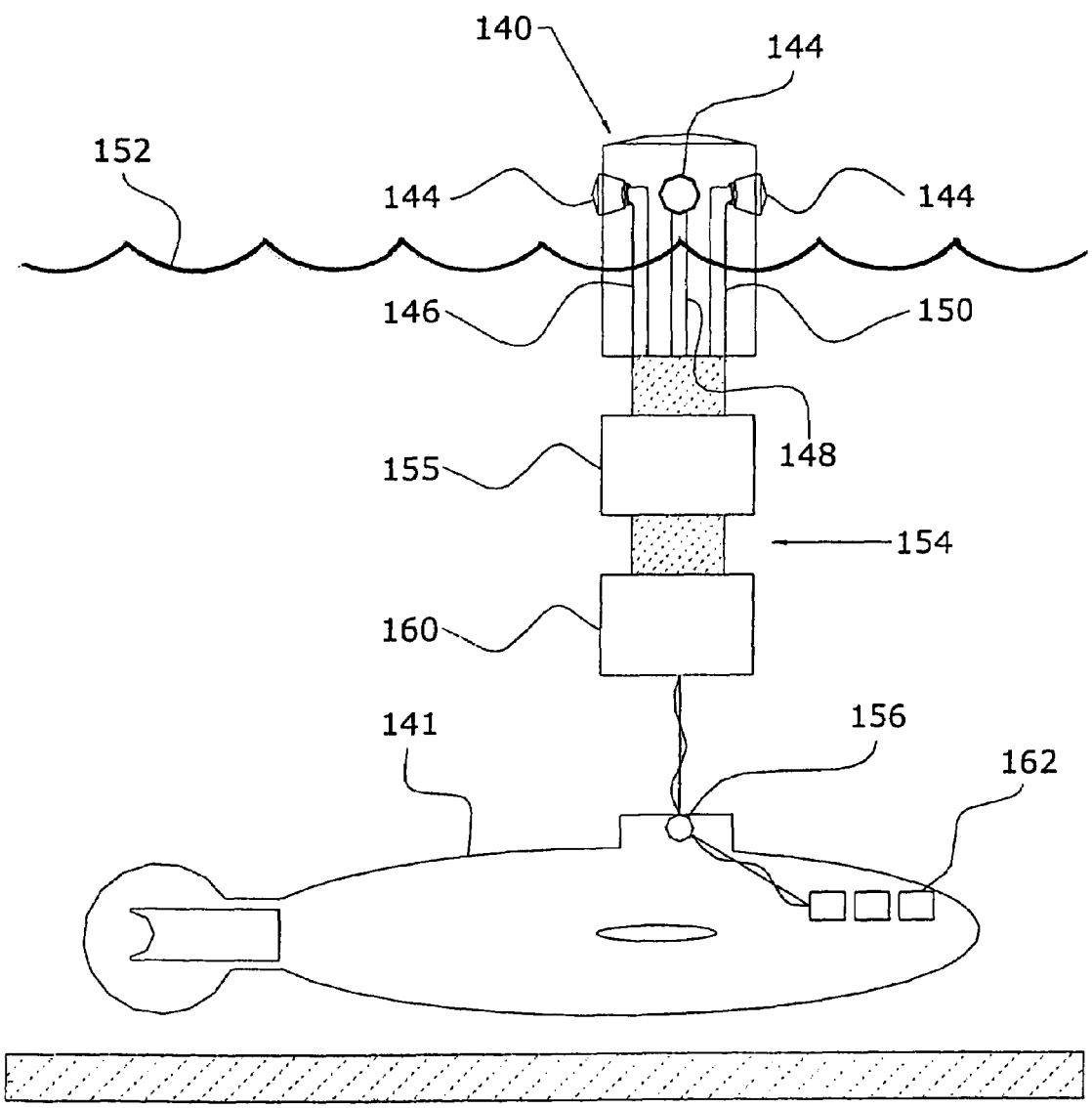
FIG. 8 shows an embodiment of an apparatus for viewing a target, fitted onto a submarine.

The system for imaging a target can be implemented into various vehicles. For example, FIG. 8 shows an optical image acquisition pod 140 implemented into an insertion vehicle 141. The exemplary optical image acquisition pod 140 includes three primary lenses 144, separated from one another by 120°, similar to that shown by example in FIGS. 4 and 5, providing three optical channels 146, 148, 150. For viewing, the primary lenses 144 are positioned above an ocean surface 152. Each optical channel 146, 148, 150 preferably is configured as shown in FIG. 3. For example, the optical elements per optical channel may include: one 180° FOV fisheye lens, one standard 35 mm cube beam splitter, one 35 mm dove prism, two 45 mm DIA planoconvex lenses, one full scene FOV adapter, one zooming microscope, and two low noise, high gain digital cameras.

The multichannel design of the insertion vehicle adds several operational features to the system concept, each related to the basic maritime nature of the device's operational environment. For example, the three channel optical configuration provides a passive mechanism to ameliorate the impact of attitudinal uncertainties upon specifying a location of targets of interest with respect to the insertion vehicle's overall field of view. Data redundancy, in addition to allowing emergency field repairs to occur and redundant data sources for targets, also provides for insertion of auxiliary sensors for specialized data acquisition without sacrificing basic capabilities. For example, optical systems for different wavelength regions may be used.

An optical snorkel pod 154 including a flotation chamber 155 preferably includes subassemblies, for various tasks.

Via a mooring cable link, the pod 154 provides a mechanical and electronic link between the optical image acquisition pod 140 and a submerged depth control winch 156 and its associated communications link. For example, the subassemblies may: establish optimum performance of the optical image acquisition pod 140 above the ocean surface 152 for target search and surveillance; perform initial processing of acquired images; provide transmittal of resultant electronically defined images to the host vehicle 141, or transmit these images to a remotely located stand-off vehicle.

An image electronics pod 160 contains, for example, circuitry to: control camera exposure and firing rates; control the dove prism rotation rate; control the microscope magnification level; control the microscope translation rate (scan); format acquired imagery for transmission to the host vehicle 141; calculate azimuth to target from on board GPS and computational data memory; imbed time-date-az to target data in image; control and update an onboard gyro or inertial sub-systems if required (pixel vs. true north); respond to host command sequences; and transmit data stream to a designated receiver. Alternatively, one or more of these features could be contained within an image electronics assembly 160 within the insertion vehicle 141. A multi-image display or displays 162 can provide visualization of the images.

Embodiments of the inventive optical system may be used in various applications. As illustrative, non-limiting examples, an optical system may be implemented into a tank. Currently, soldiers in a tank have to open up the top of the tank and stand up and look when they see a large scene view, where they are subject enemy fire. Using an optical system according to the present invention, the tank could be fully buttoned up, and the soldier could view surroundings from within the tank. Another example is for unattended ground sensors; this may be implemented particularly with a super wide-angle view, such as a 220° field of view. Other applications may include, but are not limited to, unmanned aerial vehicles, naval submarines, naval boats, as full scene imagers for airports and secure locations (for example, fitted with motion detection), imaging of incoming targets for surface to air weapons, aviation, and/or other commercial or military applications.

In comparison with other optical zooming systems, optical zooming occurs behind the primary lens. As a result, no moving external parts are required, and the direction of viewing is covert. Further, because the moving parts are behind the primary lens, the design can be potentially far more robust than with systems having external optical zooming, or optical zooming in the front lens package. Because the lens is able to transmit a much higher spatial frequency than is associated with pixel resolution on typical camera systems, optical zooming according to the present invention allows much higher resolution of magnified images than that provided by a finite pixel resolution camera sensor or other digital zooming.

The invention may preferably be used in any application in which it is important to monitor a large field of view and yet be able to monitor specific portions of the field of view at high resolution, preferably simultaneously. Night vision/reconnaissance, surveillance, and/or target acquisition are exemplary military applications. General image acquisition systems or viewing systems or more general applications, as are robots, unmanned vehicles, security systems, and any other system or device that would benefit from a wide field of view.

In air defense, as another example, the system operator can maintain complete visual orientation within an operational region, and still have the option to view frequent, random ROI selections of targets posing a potential threat or interest. The present optical system has the potential to materially enhance capabilities of both civil and military surveillance/command and control activities.

While specific embodiments of the present invention have been shown and described, it is to be understood that other modifications, substitutions, and alternatives will be apparent to those of ordinary skill in the art. Such modifications, substitutions, and alternatives can be made without departing from the spirit and scope of the present invention, which should be determined from the appended claims.

Various features of the invention are set forth in the appended claims.

What is claimed is:

1. An apparatus for viewing a target scene remote from the apparatus, the apparatus comprising:
   a housing;
   a primary lens that produces an image of the target scene at the primary lens' image plane, the target scene being remote from and external to said housing;
   at least one optical element located between an exit pupil of said primary lens and a focal plane of said primary lens, said at least one optical element being configured for providing image plane duplication at each of first and second image planes beyond an exit aperture of said at least one optical element;
   an optical magnifier positioned for magnifying a region of an image at the first image plane while leaving at least another region of the image not magnified, thus producing a magnified image of a region of the target scene utilizing a high spatial frequency inherent in the primary lens' image plane;
   at least one collimator pair disposed between said at least one optical element and said optical magnifier;
   a first detector for receiving the magnified image;
   a second detector for receiving an image at the second image plane;
   wherein said primary lens is at least partially external to said housing, and wherein said at least one optical element, said optical magnifier, said at least one collimator pair, said first detector, and said second detector are internal to said housing.

2. The apparatus of claim 1 further comprising:
   a first prism positioned in an optical path of said at least one optical element, said first prism being configured to rotate to produce a rotated image using the image from the first image plane;
   a second prism having a common optical centerline with said first prism, said second prism being configured to rotate to scan a selected diameter of the rotated image, providing a scanned image;
   wherein said optical magnifier magnifies the scanned image.

3. The apparatus of claim 2 further comprising:
   a second optical splitter disposed in an optical path of at least one of said primary lens and said optical splitter to provide an additional image of the target scene;
   a third detector for receiving the additional image.

4. The apparatus of claim 3 wherein at least one of said second detector and said third detector detects and images the target scene at least partially using non-visible radiation.

5. The apparatus of claim 1 wherein said primary lens comprises at least one wide angle lens.

6. An apparatus for viewing a target scene, the apparatus comprising:
   a primary lens that produces an image of the target scene at the primary lens' image plane;
   an optical splitter positioned in an optical path between said primary lens and the primary lens' image plane, said splitter producing duplicate and substantially identical images at each of first and second image planes on an output side of said optical splitter;

a first prism disposed in an optical path of said optical splitter, said first prism being configured to rotate to produce a rotated image using the image at said second image plane;

a second prism disposed in an optical path of said first prism and configured to selectively rotate to scan a selected diameter of the rotated image, providing a scanned image;

an optical magnifier positioned in an optical path of said second prism for magnifying the scanned image , thus producing a magnified image utilizing a high spatial frequency inherent in the primary lens'image plane;

a detector for receiving the magnified image;

a second detector positioned to receive the image at the first image plane, providing a full image scene;

wherein a region of the image at the second image plane that produces the magnified image is selectable by operation of said first and second prisms.

7. The apparatus of claim 6 wherein said primary lens comprises at least one wide angle lens having a field of view (FOV) of at least 180 degrees.

8. The apparatus of claim 6 further comprising:

an input for selectively operating at least one of said first prism and said second prism, thus enabling selection of the region from the image at the second image plane.

9. An apparatus for viewing a target scene, the apparatus comprising:

a primary lens that produces an image of the target scene at the primary lens' image plane;

an optical magnifier positioned in an optical path of an exit pupil of said primary lens for magnifying a region of the image at the image plane while leaving at least another region of the image not magnified, thus producing a magnified image of a region of the scene utilizing a high spatial frequency inherent in the image plane;

a detector for receiving the magnified image;

an optical splitter positioned in an optical path between said primary lens and the primary lens'image plane, said splitter producing duplicate and substantially identical images at each of first and second image planes on an output side of said optical splitter;

a second detector positioned to receive the image at the first image plane, providing a full image scene;

wherein said optical magnifier receives and magnifies a region of the image at the second image plane;

further comprising a dove prism positioned in an optical path of said splitter that rotates to produce a rotated image at a third image plane that is a rotated version of the image at the second image plane, a region of the rotated image being received by said optical magnifier.

10. The apparatus of claim 9 further comprising:

a first collimator lens positioned between said splitter and said dove prism to produce a collimated beam from the image at the second image plane, wherein the dove prism receives and rotates the collimated beam;

a second collimator lens positioned between said dove prism and said optical magnifier for producing said rotated image at the third image plane.

11. The apparatus of claim 10 further comprising:

at least one of a rotating TIR prism and a TIR prism pair between the second and third image plane for scanning a rotating flux bundle emerging from said dove prism, and producing a scanned image at the third image plane, wherein said optical magnifier receives the rotated and scanned image at the third image plane.

12. The apparatus of claim 11, wherein rotation of said dove prism and said at least one of a rotating TIR prism and TIR prism pair are independently selectable.

13. A method for viewing an external target scene, the method comprising:

for each of a plurality of primary lenses:

producing an image of at least part of the target scene at an image plane using the primary lens;

optically scanning the produced image, providing an optically scanned image of a selected region of the produced image while leaving at least another region of the produced image not magnified;

optically magnifying the optically scanned image, producing a magnified image utilizing a high spatial frequency inherent in the image plane;

receiving the magnified image;

wherein the method further comprises:

at least partially combining said received magnified images;

wherein each of the plurality of primary lenses has a field of view that at least partially overlaps another of the plurality of primary lenses;

wherein said method provides a 4π steridian acciuisition of the target scene.

14. The method of claim 13 further comprising, for each of the plurality of primary lenses:

optically splitting the image at the image plane into at least images at first and second image planes;

receiving the image at the first image plane, wherein said optical scanning is performed on a region of the image at the second image plane;

displaying the received image at the first image plane;

simultaneously displaying the received magnified image.

15. A method for viewing a region of interest that is within a target scene, the method comprising:

producing an image of the target scene at an image plane;

optically magnifying a region of the image including the region of interest at the image plane while leaving at least another region of the image not magnified, producing a magnified image utilizing a high spatial frequency inherent in the image plane;

receiving the magnified image;

wherein the method further comprises optically splitting the image at the image plane into at least images at first and second image planes, and receiving the image at the first image plane, wherein said optically magnifying is performed on a region of the image at the second image plane;

further comprising, prior to said optically magnifying, producing a rotated image at a third image plane, the rotated image being a rotated version of the image at the second image plane;

wherein said optically magnifying is performed on a region of the rotated image at the third image plane.

16. The method of claim 15 further comprising:

moving a field of view of an optical magnifier to the region of said rotated image at the third image plane, thus selecting a region to be magnified.

17. The method of claim 16 wherein said moving is controlled by an operator.

18. The method of claim 16 wherein said moving is controlled automatically.

19. The method of claim 15, further comprising:

scanning the rotating image and producing a scanned and rotated image, wherein said optical magnifying is performed on the scanned and rotated image.

* * * * *

UNITED STATES PATENT AND TRADEMARK OFFICE
CERTIFICATE OF CORRECTION

PATENT NO. : 7,327,513 B2  
APPLICATION NO. : 10/856695  
DATED : February 5, 2008  
INVENTOR(S) : Richard W. Johnson It is certified that error appears in the above-identified patent and that said Letters Patent is hereby corrected as shown below:

In the Specification:

Col. 5, line 49  After "microscope 16" insert --(shown in FIG. 1)--.

Col. 9, line 17  Delete "lens system 79" and replace with --lens system 76--.

Col. 9, line 21  Delete "FOV" and replace with --FOV image--.

Col. 9, line 47  Delete "prism 66" and replace with --prism 86--.

Col. 9, line 49  Delete "causing" and replace with --causes--.

Signed and Sealed this

First Day of June, 2010

David J. Kappos  
*Director of the United States Patent and Trademark Office*